US012043479B2

(12) United States Patent
Julien et al.

(10) Patent No.: US 12,043,479 B2
(45) Date of Patent: Jul. 23, 2024

(54) RECYCLING LID

(71) Applicant: IMPACT PLASTICS CORPORATION, Elgin, IL (US)

(72) Inventors: Adam Donald Julien, Oswego, IL (US); Brian Beth, Hinsdale, IL (US); Paul Reidy, Deerfield, IL (US); Vonn McQuiston, Johnsburg, IL (US); Scott Myers, Lisle, IL (US)

(73) Assignee: IMPACT PLASTICS CORPORATION, Elgin, IL (US)

( * ) Notice: Subject to any disclaimer, the term of this patent is extended or adjusted under 35 U.S.C. 154(b) by 345 days.

(21) Appl. No.: 17/411,715

(22) Filed: Aug. 25, 2021

(65) Prior Publication Data

US 2022/0063906 A1 Mar. 3, 2022

Related U.S. Application Data

(60) Provisional application No. 63/069,955, filed on Aug. 25, 2020.

(51) Int. Cl.
*B65F 1/16* (2006.01)

(52) U.S. Cl.
CPC .......... *B65F 1/1607* (2013.01); *B65F 1/1646* (2013.01); *B65F 2250/116* (2013.01)

(58) Field of Classification Search
CPC ........ B65F 1/16; B65F 1/1653; B65F 1/1607; B65F 1/1646; B65F 2210/1121; B65F 2240/16
See application file for complete search history.

(56) References Cited

U.S. PATENT DOCUMENTS

| | | | | | |
|---|---|---|---|---|---|
| 3,322,477 | A * | 5/1967 | Armijo | B65F 7/00 | 248/101 |
| 4,126,241 | A * | 11/1978 | Klosk | B65F 1/02 | 220/908 |
| 4,456,141 | A * | 6/1984 | Pamment | B65F 1/1607 | 220/826 |
| 5,044,644 | A * | 9/1991 | Duran | B62B 3/10 | 280/47.35 |
| 8,544,673 | B1 * | 10/2013 | Polk | B65F 1/1607 | 383/33 |
| 10,377,567 | B1 * | 8/2019 | Jones | B65F 1/1615 | |
| 2006/0273097 | A1 * | 12/2006 | Taylor | B65F 1/16 | 220/782 |

(Continued)

*Primary Examiner* — Don M Anderson
(74) *Attorney, Agent, or Firm* — KATTEN MUCHIN ROSENMAN LLP

(57) ABSTRACT

The lid comprises a horizontal front surface, a horizontal rear surface, and a recycling chute disposed between the horizontal front surface and the horizontal rear surface. The recycling chute comprises a front surface having an opening, a first sidewall connected with the front face, a second sidewall connected with the front face, and an angled top surface. The angled top surface is connected to the front surface, the first sidewall, the second sidewall, and the horizontal rear surface and the angled top surface is angled downward from the front surface towards the horizontal rear surface. The opening comprises an obround slot and a widened central section, with the widened central section being a cut out in the front surface above the obround slot.

11 Claims, 8 Drawing Sheets

(56) References Cited

U.S. PATENT DOCUMENTS

| | | | | |
|---|---|---|---|---|
| 2014/0291328 | A1* | 10/2014 | Jarrett | B65F 1/0046 220/495.07 |
| 2014/0367292 | A1* | 12/2014 | Bonello | G09F 23/00 206/459.1 |
| 2019/0382195 | A1* | 12/2019 | Jones | B65F 1/004 |

* cited by examiner

RECYCLING LID

CROSS-REFERENCE TO RELATED APPLICATIONS

This application claims priority to U.S. Provisional Application Ser. No. 63/069,955, filed Aug. 25, 2020, the entire contents of which are hereby incorporate by reference in their entirety.

FIELD OF THE INVENTION

The invention relates to recycling lids for use on containers, such as dumpsters. More particularly, the invention discloses a recycling lid for receiving single stream recyclables while preventing entry of land fill trash bags.

BACKGROUND

In many communities, refuse must be sorted separately into trash and recyclables. Often, if trash bins are full, people may attempt to place their trash bags into the recycling bin since no other option may be available. This may cause the person or owner of the building to be fined or to have trash collection privileges reduced or stopped. Further, if trash is found to be mixed in with the recycling bin, all of it may need to be sent to the dump instead of being recycled. Therefore, a need exists for a recycling lid which prevents entry of trash bags while allowing for the deposit of single stream recyclables, such as pieces of cardboard or plastic/metal containers.

SUMMARY

The lid comprises a horizontal front surface, a horizontal rear surface, and a recycling chute disposed between the horizontal front surface and the horizontal rear surface. The recycling chute comprises a front surface having an opening, a first sidewall connected with the front face, a second sidewall connected with the front face, and an angled top surface. The angled top surface is connected to the front surface, the first sidewall, the second sidewall, and the horizontal rear surface and the angled top surface is angled downward from the front surface towards the horizontal rear surface. The opening comprises an obround slot and a widened central section, with the widened central section being a cut out in the front surface above the obround slot.

DETAILED DESCRIPTION

Figure 1:
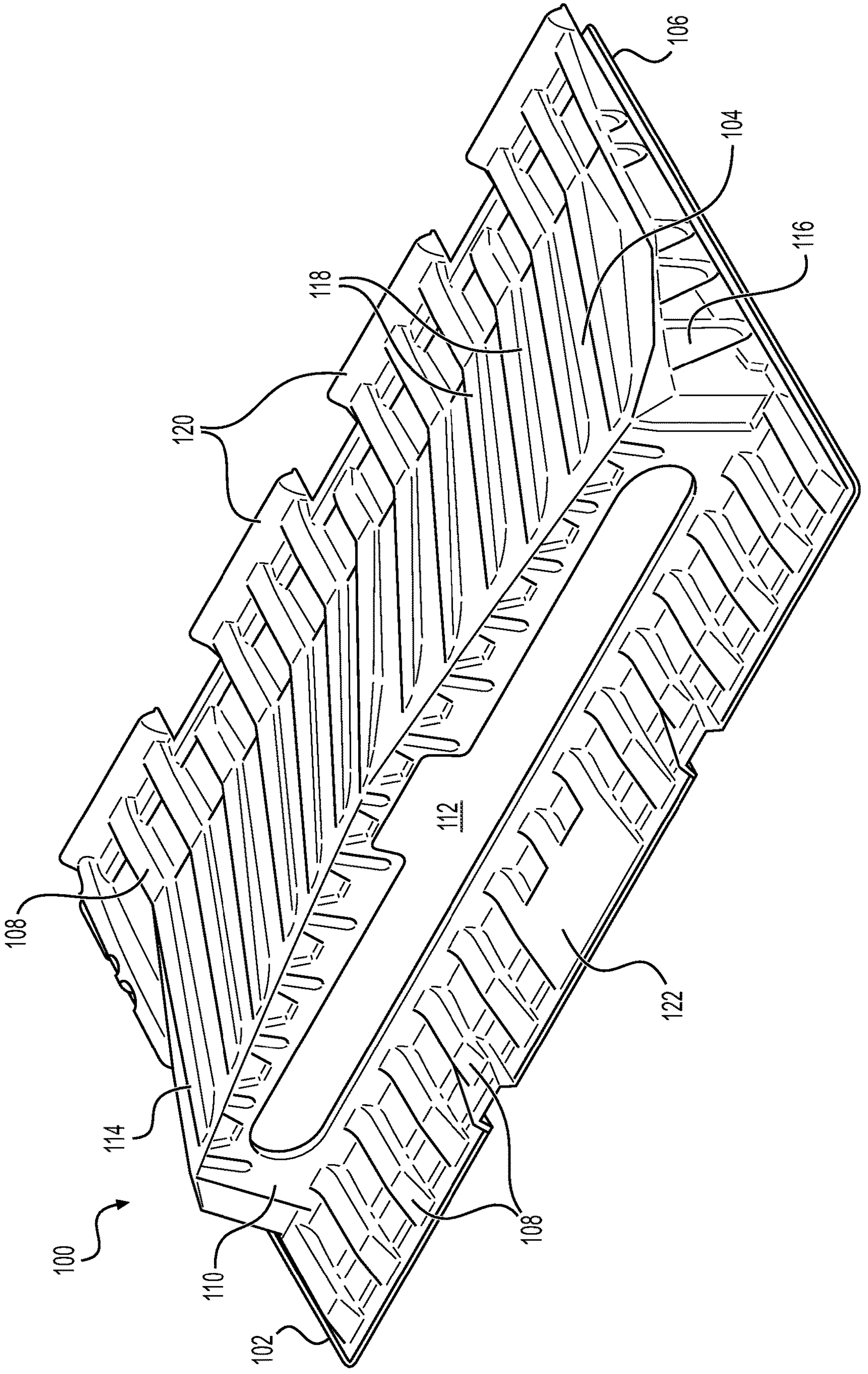
FIG. 1 depicts a front right perspective view of the recycling lid.

FIG. 1 depicts a front right perspective view of recycling lid 100. Recycling lid 100 generally comprises front surface 102, recycling chute 104, and rear surface 106. Front surface 102 and rear surface 106 are coplanar and have a plurality of parallel reinforcing ribs 108 which provide torsional and bending rigidity to recycling lid 100. Front face 110 of recycling chute 104 comprises opening 112 for depositing recyclables there through, angled top surface 114 extending between an edge of front face 110 and rear surface 106, and sidewalls 116. Similar to front surface 102 and rear surface 106, angled top surface 114 comprises a plurality of transvers, parallel reinforcing ribs 118. Sidewalls 116 decrease in height from front face 110 towards rear surface 106.

A plurality of hinge extensions 120 extensions extend from a rear edge of rear surface 106 to allow recycling lid 100 to be rotatably coupled to a container and to help prevent dislodgment. Recycling lid 100 may be coupled to the container by placing a locking band around a top of front surface 102 and a bottom of a lip of the container, preventing unauthorized removal of recycling lid 100. Other means may also be provided to couple recycling lid 100 to a container. For example, projection may extend downward from front surface 102 or sidewalls 116 and a lock placed through the projection may be secured.

An overall distance of hinge extensions 120 edge to edge is approximately 71.5" and an overall length of recycling lid 100 is preferably 74" and an overall width of recycling lid 100 is preferably 41-42". However, the width and length of recycling lid 100 may be modified to fit any sized container. For example, recycling lid 100 may have a width of 48" or 58".

In some embodiments, front surface 102 comprises a label pad 122 which can be used to affix a label to recycling lid 100. The label may include branding information, use instructions, etc.

Figure 2:
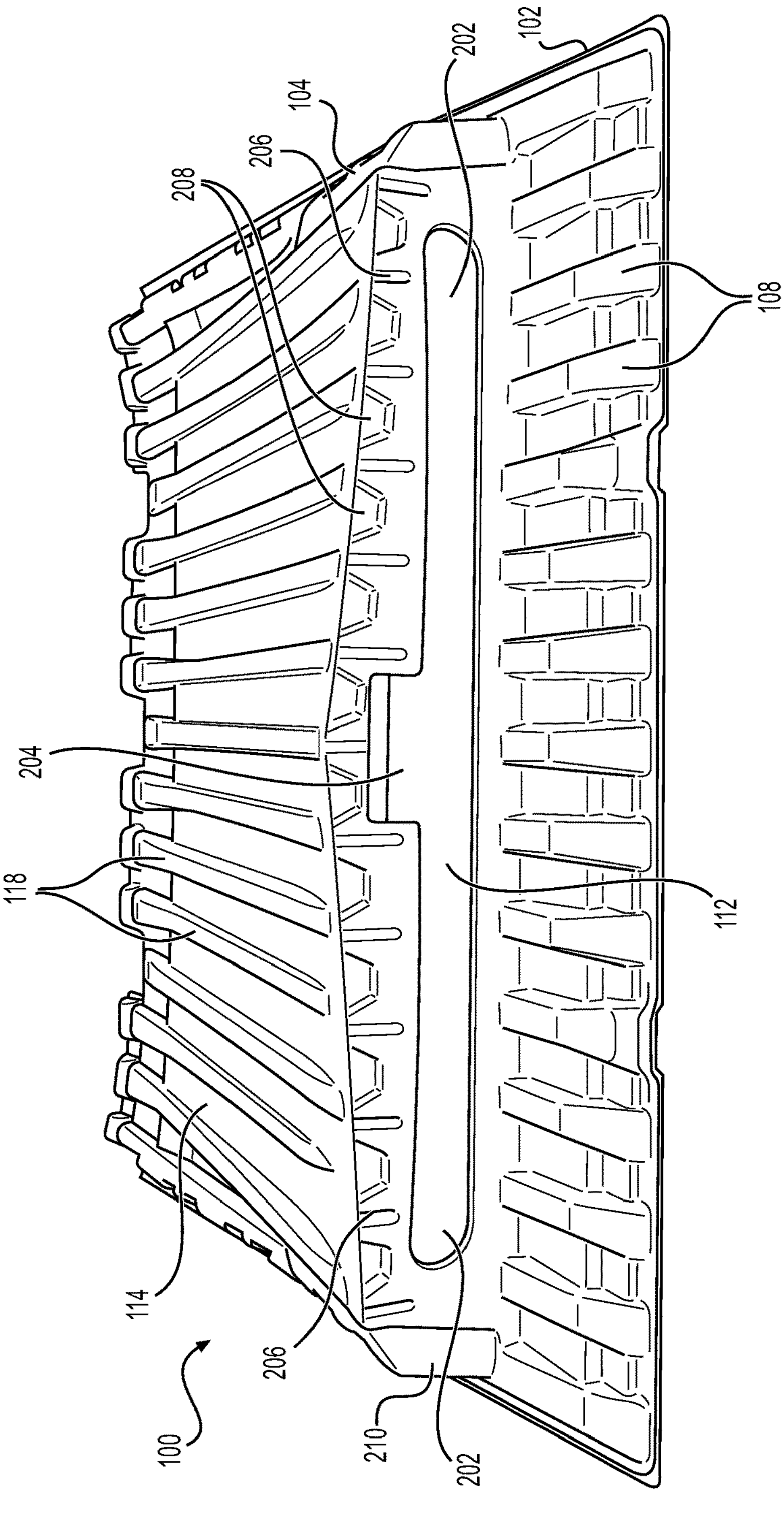
FIG. 2 depicts a top perspective view of the recycling lid.

Referring next to FIG. 2, depicted is a top perspective view of recycling lid 100. In this view, it is more apparent that a center of front face 100 is higher in the center and tapers to sidewalls 116. This allows opening 112 to be formed from a combination of an obround slot 202 and a central region 204 having a greater height, but a smaller width. The obround slot 202 may also be rectangular. The obround slot 202 can be utilized to allow broken-down corrugated cardboard to slide through the slot to enter the container. Similarly, central region 204 has a height and width great enough to allow larger recyclable goods, such as milk jugs, laundry detergent bottles, etc., to be placed through central region 204. Obround slot 202 and central region 204 are both sized so that land fill trash bags 112 cannot be inserted through opening 112.

Figure 4:
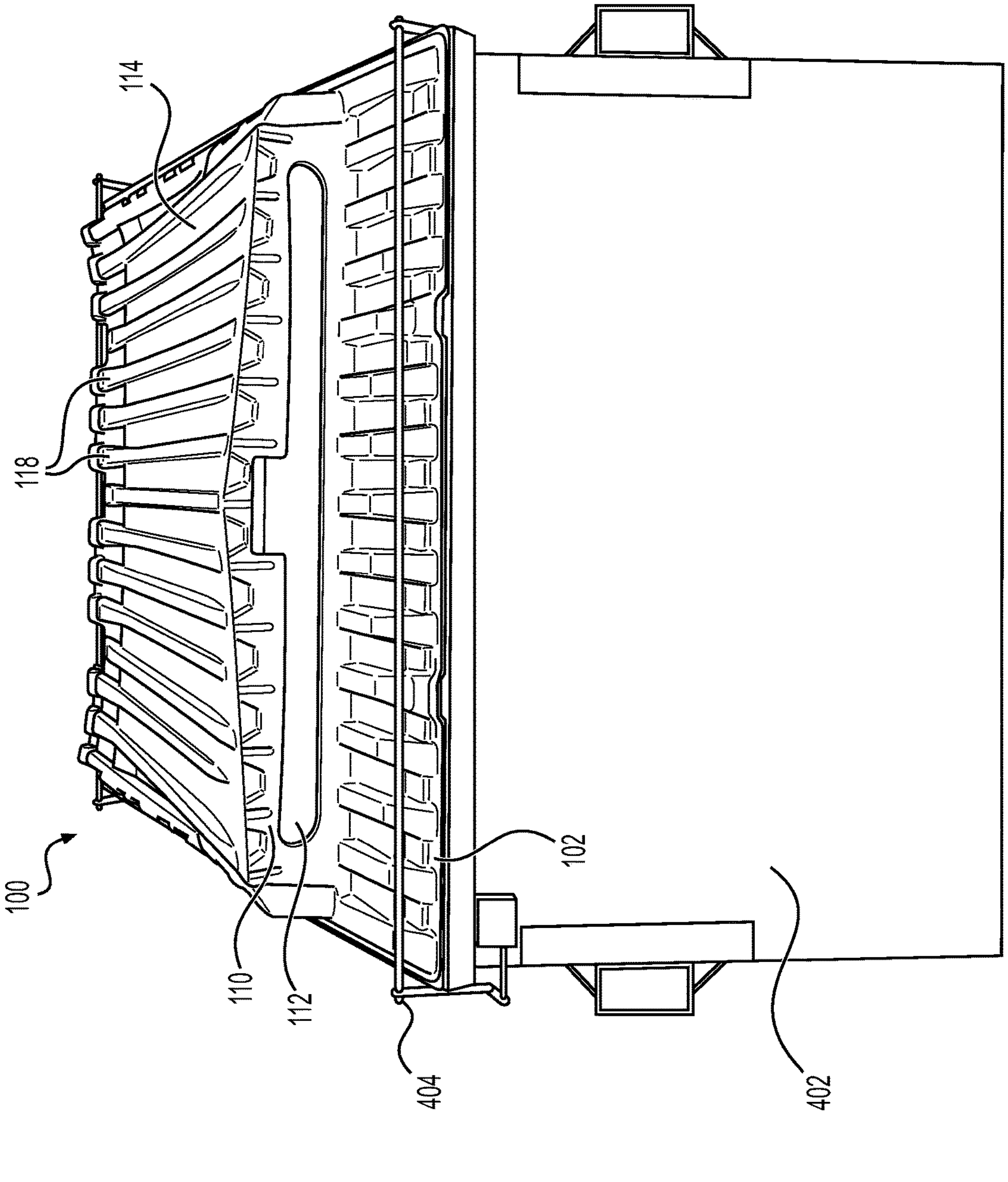
FIG. 4 depicts a front view of the recycling lid coupled to a container.
Figure 5:
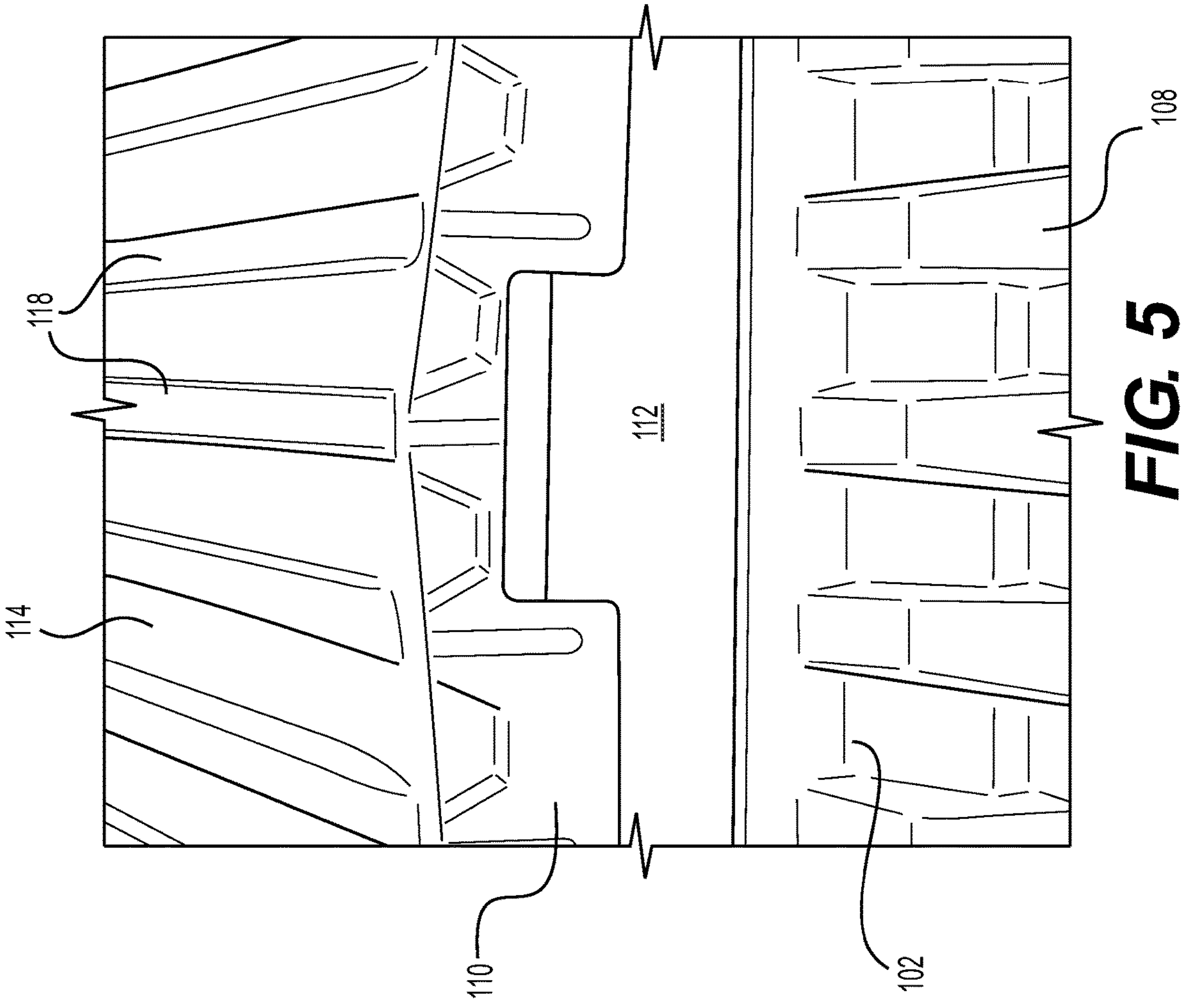
FIG. 5 depicts an enhanced view of the central cutout of the recycling lid.
Figure 6:
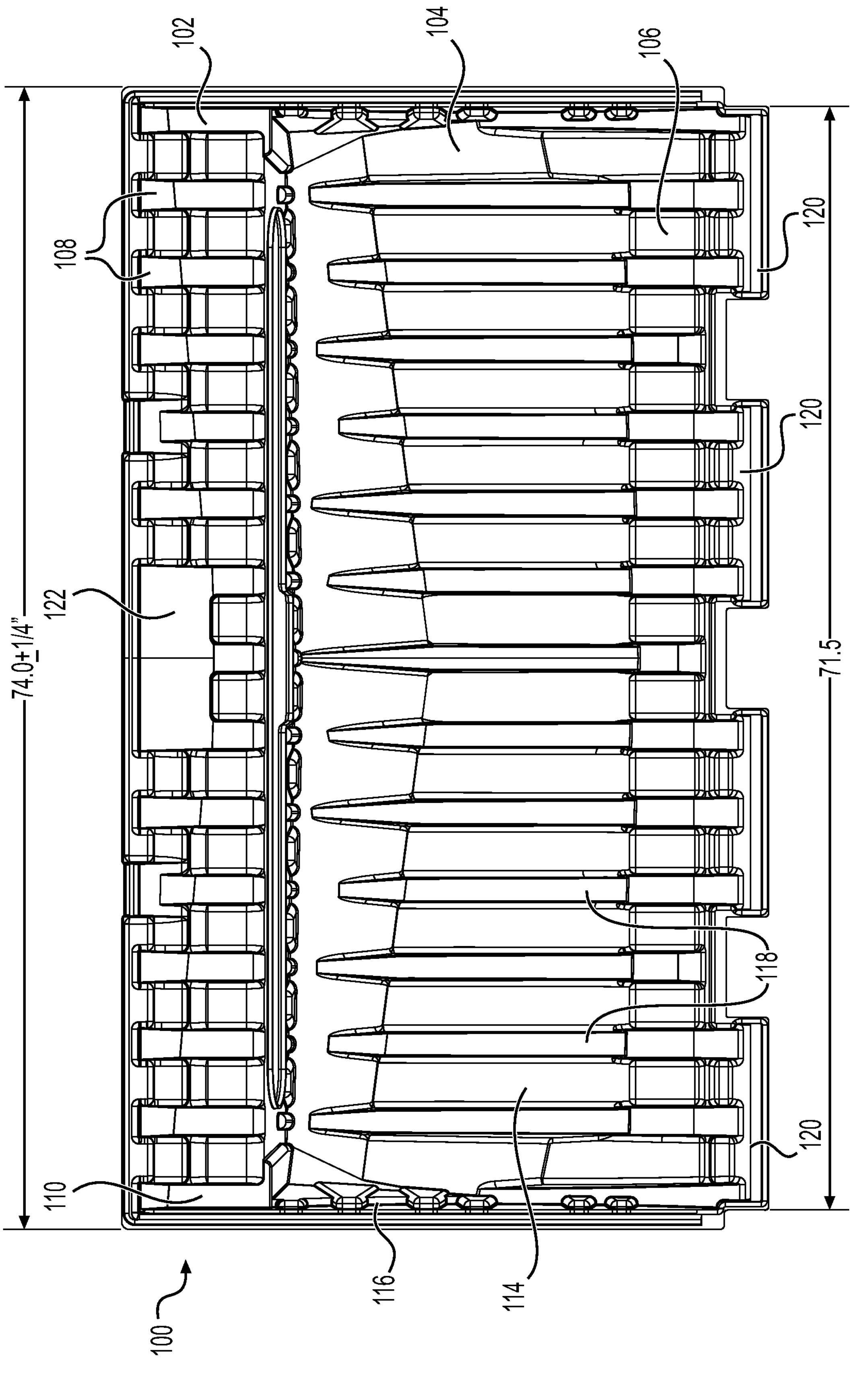
FIG. 6 depicts a top plan view of the recycling lid.
Figure 7:
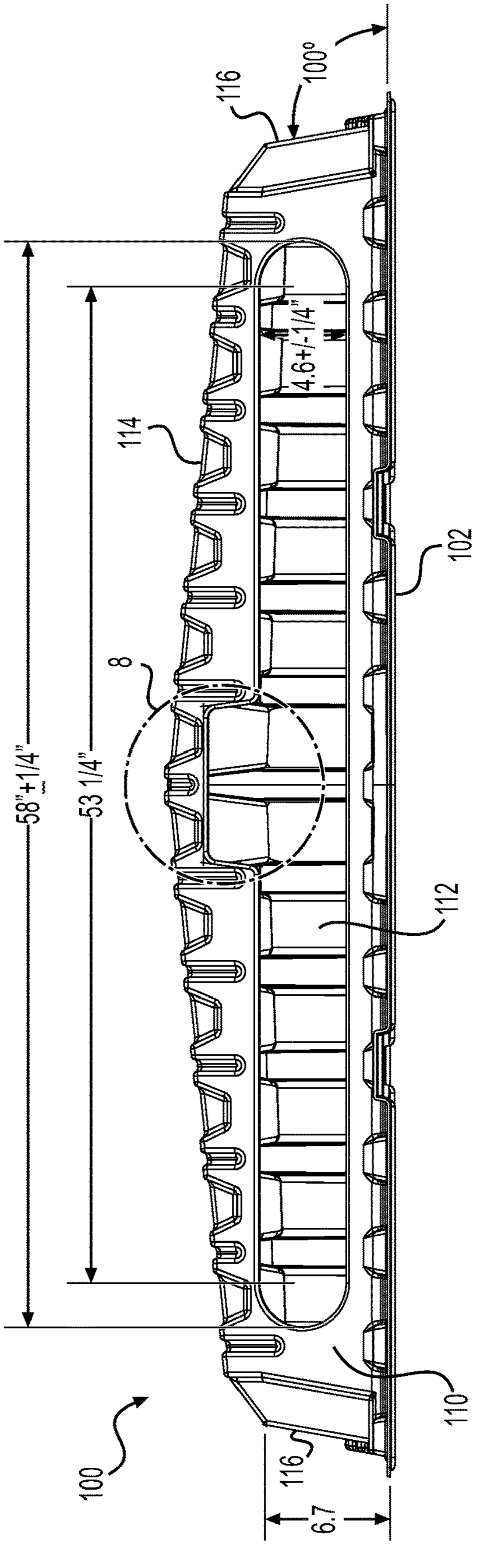
FIG. 7 depicts another front view of the recycling lid.

An enhanced view of obround slot 202 is depicted in FIG. 6 and an enhanced view of central region 204. Central region 204 may have a square/rectangular shape as depicted in FIGS. 1 and 2 or the combination of obround slot 202 and central region 204 may have a “sombrero” shape as depicted in FIG. 4.

Figure 8:
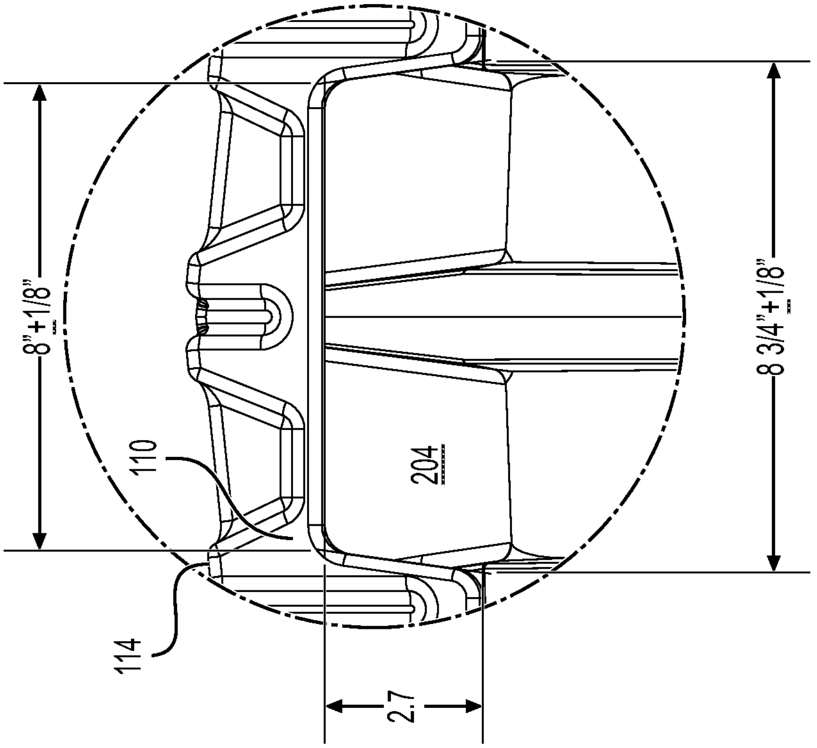
FIG. 8 depicts an enhanced view of FIG. 7.

Obround slot 202 preferably has an overall length of 58", with the central rectangular portion having a width of 53.25". A height of sidewalls 116 is preferably 6.7" and sidewalls 116 are angled inward towards top angled surface 114 at approximately 100°. Further, as shown in FIG. 8, the upper portion of central region 205 preferably has a width of 8" which increases to 8.75" towards obround slot 202 with a height of 2.7".

The edge joining top angled surface 114 to front face 110 is further provided with a plurality of front ribs 206 and gussets 208. The corners of front face 110 which are coupled to sidewalls 116 are further provided with a corner support structure 210. These structural features keep recycling lid 100 from collapsing if someone attempts to cut through recycling chute 104.

Figure 3:
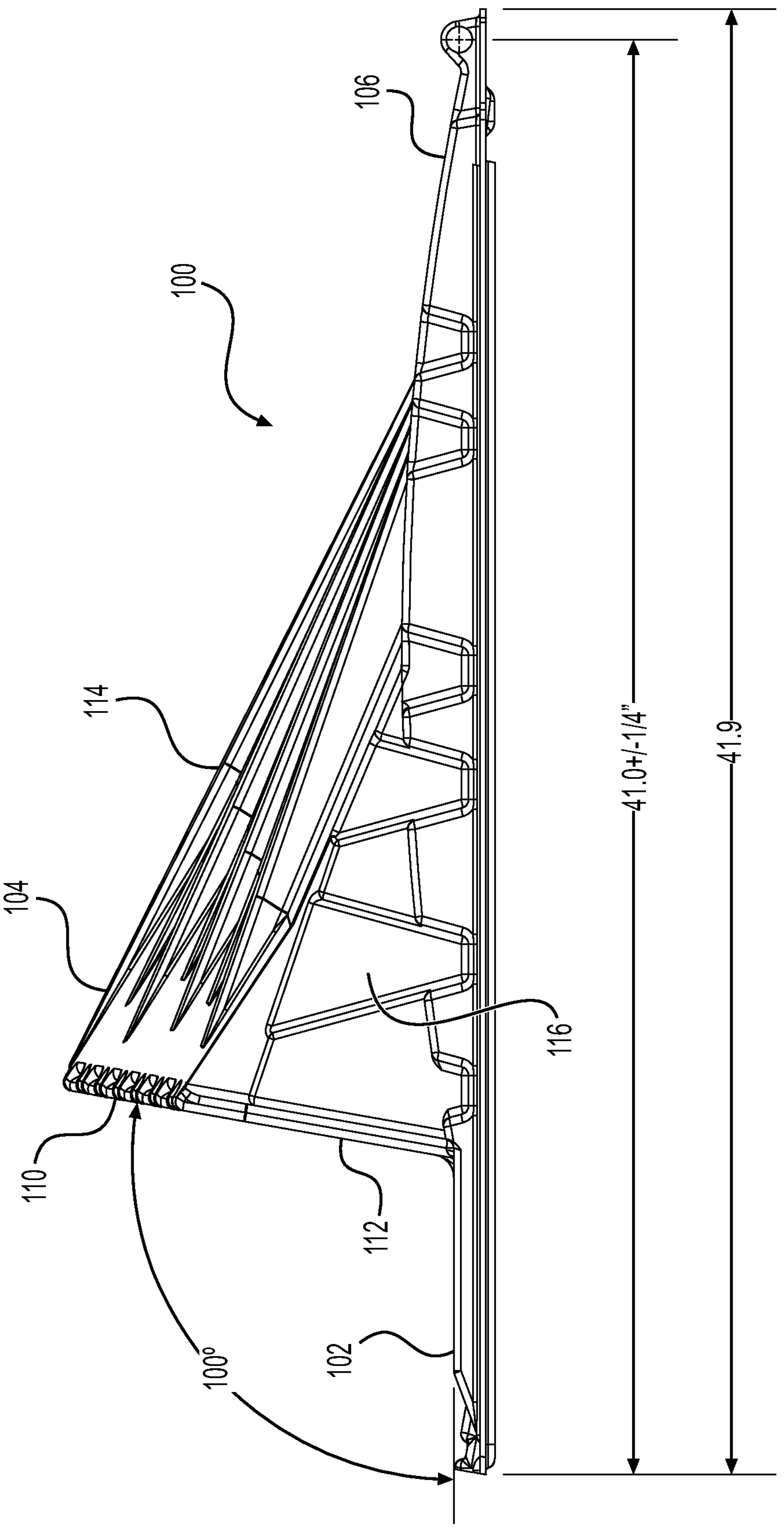
FIG. 3 depicts a right side view of the recycling lid.

FIG. 3 depicts is a side view of recycling lid 100. In this view, the profile of recycling cute 104 is more apparent. Front face 110 forms a 100° angle with respect to front surface 102. This angle helps recyclables placed through opening 112 to fall into the container. Further the decrease in height of top surface 114 from front face 110 to rear surface 106 is more apparent in this figure. This decrease in height prevents large objects from being forced through central section 112 because they will contact a bottom of angled top surface 114 and be prevented from being inserted. Angled top surface 114 also helps to guide objects placed through obround slot 202 downward and into the container.

FIG. 4 depicts recycling lid 100 coupled to a container 402. As shown in this embodiment, a locking member 404 can be rotated over top surface 101 and secure in place with a lock, preventing removal of recycling lid 100 from container 402.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof. Any one or more features or functions of the first/other aspects/embodiments disclosed above may also be incorporated into the second/present aspect/embodiment, alone or in any combination.

The invention claimed is:

1. A lid comprising:

a horizontal front surface;

a horizontal rear surface; and a recycling chute disposed between the horizontal front surface and the horizontal rear surface, wherein the recycling chute comprises:

a front surface having an opening;

a first sidewall connected with the front surface;

a second sidewall connected with the front surface; and an angled top surface, wherein a first edge of the front surface is directly coupled to a first edge of the angled top surface, wherein a first edge of the first sidewall surface is directly coupled to a second edge of the angled top surface, wherein a first edge of the second sidewall is directly coupled to a third edge of the angled top surface, wherein a first edge of the horizontal rear surface is directly coupled to a fourth edge of the angled top surface wherein the angled top surface is entirely angled downward from the first edge of the front surface to the first edge of the horizontal rear surface;

wherein the opening comprises a slot and a widened central section, wherein the widened central section is a cut out in the front surface above the slot.

2. The lid according to claim 1, wherein the front surface forms an approximately 100° angle with the horizontal front surface.

3. The lid according to claim 1, wherein the horizontal front surface comprises a plurality of evenly spaced reinforcing ribs and a central flat section for receiving a label.

4. The lid according to claim 1, wherein the cut out has a width of 8 to 9 inches and a height of 2.5 to 3.5 inches.

5. The lid according to claim 4, wherein the slot has a width of 58 to 59 inches and a height of 4.5 to 5 inches.

6. The lid according to claim 1, wherein the first sidewall and the second sidewall are angled towards the top surface at approximately 100°.

7. The lid according to claim 1, further comprising:

a plurality of hinge couplings extending from the horizontal rear surface for coupling the lid to a container.

8. The lid according to claim 1, wherein the horizontal front surface comprises a first plurality of reinforcing ribs, and wherein a horizontal rear surface comprises a second plurality of reinforcing ribs aligned with the first plurality of reinforcing ribs.

9. The lid according to claim 8, wherein the angled top surface comprises a third plurality of reinforcing ribs that are an extension of the second plurality of reinforcing ribs extending from the horizontal rear surface to near the first edge angled top surface.

10. The lid according to claim 1, wherein the lid has a unitary construction.

11. The lid according to claim 1, wherein an angle formed by the horizontal front surface with the front surface is greater than an angle formed by the horizontal rear surface and the angled top surface.

* * * * *